(12) United States Patent
Zhang et al.

(10) Patent No.: US 11,122,146 B2
(45) Date of Patent: Sep. 14, 2021

(54) INFORMATION PROCESSING METHOD, ELECTRONIC DEVICE AND COMPUTER PROGRAM PRODUCT

(71) Applicant: EMC IP Holding Company LLC, Hopkinton, MA (US)

(72) Inventors: Yun Zhang, Shanghai (CN); Jing Yu, Shanghai (CN); Ming Zhang, Shanghai (CN); Zhilhong Zeng, Shanghai (CN); Jingjing Guo, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 249 days.

(21) Appl. No.: 16/367,386

(22) Filed: Mar. 28, 2019

(65) Prior Publication Data

US 2020/0120184 A1 Apr. 16, 2020

(30) Foreign Application Priority Data

Oct. 12, 2018 (CN) .......................... 201811191661.1

(51) Int. Cl.
*H04L 29/08* (2006.01)
*H04L 29/06* (2006.01)

(52) U.S. Cl.
CPC ............ *H04L 67/322* (2013.01); *H04L 67/42* (2013.01)

(58) Field of Classification Search
CPC ............................... H04L 67/42; H04L 67/322

USPC ........................................................ 709/217
See application file for complete search history.

(56) References Cited

U.S. PATENT DOCUMENTS

| 6,820,210 | B1* | 11/2004 | Daruwalla | H04L 12/42 370/222 |
|---|---|---|---|---|
| 2009/0017844 | A1* | 1/2009 | Li | H04W 68/00 455/458 |
| 2011/0107084 | A1* | 5/2011 | Hubner | H04L 67/2804 713/153 |
| 2011/0252240 | A1* | 10/2011 | Freedman | H04L 63/0823 713/169 |
| 2019/0174416 | A1* | 6/2019 | Zhang | H04W 68/02 |

\* cited by examiner

*Primary Examiner* — James E Springer
(74) *Attorney, Agent, or Firm* — Chamberlain, Hrdlicka, White, Williams & Aughtry (57) ABSTRACT

Embodiments of the present disclosure provide an information processing method, an electronic device and a computer program product. According to an embodiment, the method comprises: obtaining, by a first client, metadata of a first message in a message pool; in response to the metadata indicating that the first message is associated with the first client, pulling the first message by the first client; in response to the metadata indicating that the first message is associated with the second client, determining a priority of the first message; and in response to determining that the priority of the first message exceeds a predetermined threshold, sending a first paging message by the first client to the second client to enable the second client to pull the first message associated with the second client.

20 Claims, 6 Drawing Sheets

FIG.6

INFORMATION PROCESSING METHOD, ELECTRONIC DEVICE AND COMPUTER PROGRAM PRODUCT

CROSS-REFERENCE TO RELATED APPLICATIONS

This application claims priority to Chinese Patent Application No. 201811191661.1 filed on Oct. 12, 2018. Chinese Patent Application No. 201811191661.1 is hereby incorporated by reference in its entirety.

FIELD

Embodiments of the present disclosure generally relate to a method of information processing, and more specifically, to a method, electronic device and computer program product for information processing between a server and clients.

BACKGROUND

As cloud-based data protection becomes more and more popular, users start to deploy their data backup at a data protection server on a cloud (a public space, such as Internet), so as to make the backup data always accessible. For enterprise users, a Network Address Translation (NAT) gateway and/or firewall is provided, and the NAT gateway and/or firewall allows computers in an enterprise network to access one another and the Internet, while computers on the Internet are unable to access any computer in the enterprise network.

The presence of the NAT gateway and/or firewall creates obstacles for a server outside the enterprise network, which needs direct access to client computers. For example, the server may be required to browse data at a client side to execute backup, or request the client to start backup/recovery immediately.

SUMMARY

In view of the above problem, there is provided a solution of information processing, according example implementations of the present disclosure. However, the disclosure is not limited to addressing the aforementioned problem.

In a first aspect of the present disclosure, there is provided an information processing method. Specifically, the method comprises: obtaining, by a first client, metadata of a first message in a message pool; in response to the metadata indicating that the first message is associated with the first client, pulling the first message by the first client; in response to the metadata indicating that the first message is associated with the second client, determining a priority of the first message; and in response to determining that the priority of the first message exceeds a predetermined threshold, sending a first paging message by the first client to the second client, to enable the second client to pull the first message associated with the second client.

In a second aspect of the present disclosure, there is provided an information processing method. The method comprises: setting metadata of messages in a message pool at a server; determining, based at least in part on the number of a plurality of clients associated with the server, a cycle for a client of the plurality of clients to access the messages in the message pool; and sending a configuration of the cycle to the client of the plurality of clients such that the client of the plurality of clients accesses the message pool according to the cycle.

In a third aspect of the present disclosure, there is provided an electronic device. The electronic device comprises: a processor; and a memory coupled to the processor, the memory having instructions stored therein which, when executed by the processor, cause the electronic device to perform acts of: obtaining, by a first client, metadata of a first message in a message pool; in response to the metadata indicating that the first message is associated with the first client, pulling the first message by the first client; in response to the metadata indicating that the first message is associated with a second client, determining a priority of the first message; and in response to determining that the priority of the first message exceeds a predetermined threshold, sending a first paging message by the first client to the second client, to enable the second client to pull the first message associated with the second client.

In a fourth aspect of the present disclosure, there is provided an electronic device. The electronic device comprises: a processor; and a memory coupled to the processor, the memory having instructions stored therein which, when executed by the processor, cause the electronic device to perform acts of: setting metadata of messages in a message pool at a server; determining, based at least in part on the number of a plurality of clients associated with the server, a cycle for a client of the plurality of clients to access the messages in the message pool; and sending a configuration of the cycle to the client of the plurality of clients such that the client of the plurality of clients accesses the message pool according to the cycle.

In a fifth aspect of the present disclosure, there is provided a computer program product. The computer program product is tangibly stored on a computer readable medium and comprises computer executable instructions which, when executed, causes a device to perform the method according to the first or second aspect of the present disclosure.

It will be appreciated that the contents as described in the Summary are not intended to identify key features or essential features of the embodiments of the present disclosure, nor are they intended to be used to limit the scope of the present disclosure. Other features of the present disclosure will be made apparent by the following description.

BRIEF DESCRIPTION OF THE DRAWINGS

Through the following detailed description with reference to the accompanying drawings, the above and other features, advantages and aspects of various embodiments of the present disclosure will become more apparent. Throughout the drawings, the same reference symbols generally refer to the same elements, wherein.

DETAILED DESCRIPTION OF EMBODIMENTS

Implementations of the present disclosure will now be described in detail with reference to the accompanying drawings. Although the drawings illustrate some implementations of the present disclosure, it would be appreciated that the present disclosure may be implemented in various manners but cannot be construed as being limited by the embodiments illustrated herein. Rather, these embodiments are provided to disclose the present disclosure more thoroughly and completely. It would be appreciated that the drawings and embodiments are provided only as examples, without any intention of limiting the protection scope of the present disclosure.

In the description about embodiments of the present disclosure, the term "includes" and its variants are to be read as open-ended terms that mean "includes, but is not limited to." The term "based on" is to be read as "based at least in part on." The term "an embodiment/implementation" or "the embodiment/implementation" is to be read as "at least one embodiment/implementation." The terms "first," "second," and the like may refer to different or the same objects. Other definitions, either explicit or implicit, may be included below.

Figure 1:
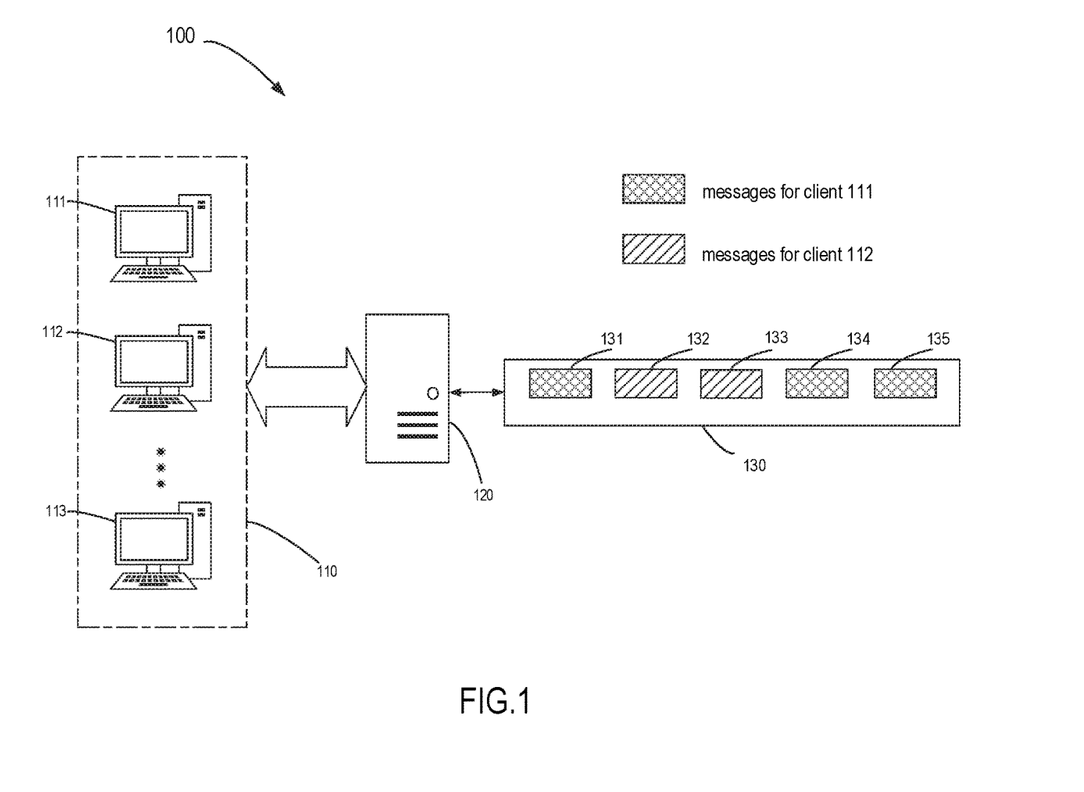
FIG. 1 illustrates a network in which one or more embodiments of the present disclosure can be implemented.

FIG. 1 illustrates a diagram of a network 100 in which an embodiment of the present disclosure can be implemented. The network 100 includes a subnet 110 and a server 120. For example, the subnet 110 can be a NAT subnet or other type of subnet. The subnet 100 can include a plurality of clients 111, 112 . . . 113. The clients 111, 112 . . . 113, for example, may be computers or any other terminals. The server 120 can be a cloud server or other type of server. The clients in the subnet 110 and the server 120 can be in communicating connection via a gateway and/or firewall.

Due to the presence of the gateway and/or firewall, the clients 111, 112 . . . 113 in the subnet 110 can access one another, or access the Internet (for example, access the server 120), but a device in the Internet is unable to access the subnet 110 actively and directly. For example, the server 120 is unable to actively or directly access the clients 111, 112 . . . 113 in the subnet 110. However, in some cases, the server 120 may attempt to access data on the clients 111, 112 . . . 113 (for example, for the purpose of backup, read, storage and the like) or request the clients 111, 112 . . . 113 to execute operations (for example, to start data backup/recovery operations and the like). Being unable to access the clients, the server 120 may generate a message for a certain client in this case, and the message indicates a task that the server 120 requests the client to execute (for example, sending data, executing an operation and the like). The clients 111, 112 . . . 113 can pull these messages by accessing the server 120, and execute the corresponding tasks.

FIG. 1 illustrates a message pool 130 which includes therein a plurality of messages generated by the server 120 for one or more clients, such as messages 131, 132, 133, 134, 135 and the like. For the purpose of illustration, only messages for clients 111 and 112 are shown in the message pool 130 in FIG. 1. Depending on the access objective of the server 120 for a certain target client, messages 131, 132, 133, 134 and 135 can be of various types, such as request messages, messages with data, or the like. The message pool 130 can be stored in the server 120 or can be located on any other external storage device accessible for the server 120.

Each message in the message pool 130 can be at least defined to include a payload and metadata. For example, the payload may include a task type, task parameter, task window and the like, and metadata may include a priority, target client and the like. As an example, the target client, for example, may be indicated by one or more items of information, such as a client name, client IP, client port and the like. The clients 111, 112 . . . 113 may access the server 120, and pull respective messages thereof from the message pool 130 based on the metadata of the messages.

It would be appreciated that the number of devices, the number of messages and the arrangement between devices, as shown in FIG. 1, are provided only as an example. In other implementations, more or fewer, or other different numbers of clients may be included, and the message pool generated by the server can also include more or fewer messages, or messages for other different clients.

In the scenario where the server is unable to access the client, e.g., because continuously executing operations from a server is dependent on pull of messages by clients, how the clients pull messages at the server side will affect the system efficiency. In a conventional solution, a client accesses the message pool repeatedly in a substantially fixed cycle and pulls the messages belonging to it. The cycle is typically set to more than 15 seconds or even several minutes, to avoid surge of too many pull requests when there is a large number of clients.

However, the conventional solutions contain multiple problems. For example, the client always pulls messages in a substantially fixed interval, which indicates that the length of the time window for a round of sequential accesses and pulls completed by all of the clients is also fixed. In this case, when the number of clients is increased, the pressure of the server grows. In addition, this solution is only applicable to delay-tolerance tasks. For example, the planned backup task is typically provided with a backup time window ranging from 1 hour to several hours. In comparison with actual backup time and the entire backup time window, the final result is not affected even though the task is completed several minutes late. However, there arises a problem for tasks requiring an immediate response from the client. For example, users may wait for a User Interface (UI) to respond to browse requests, or they are required to initiate recovery requests immediately to reduce business loss.

According to embodiments of the present disclosure, there is provided a solution for information processing of clients and a server. In the solution of the present disclosure, the clients access the server and a cycle for pulling messages can be determined based at least in part on the number of clients. As such, the cycle is determined dynamically, rather than in a fixed manner. Moreover, when accessing the message pool, a client can page a further client if it finds a message with a high priority associated with the further client, so that the further client can pull rapidly the message with the high priority from the server. The solution according to the present disclosure can relieve the pressure on the server when controlling the delay at a lower level.

Figure 2:
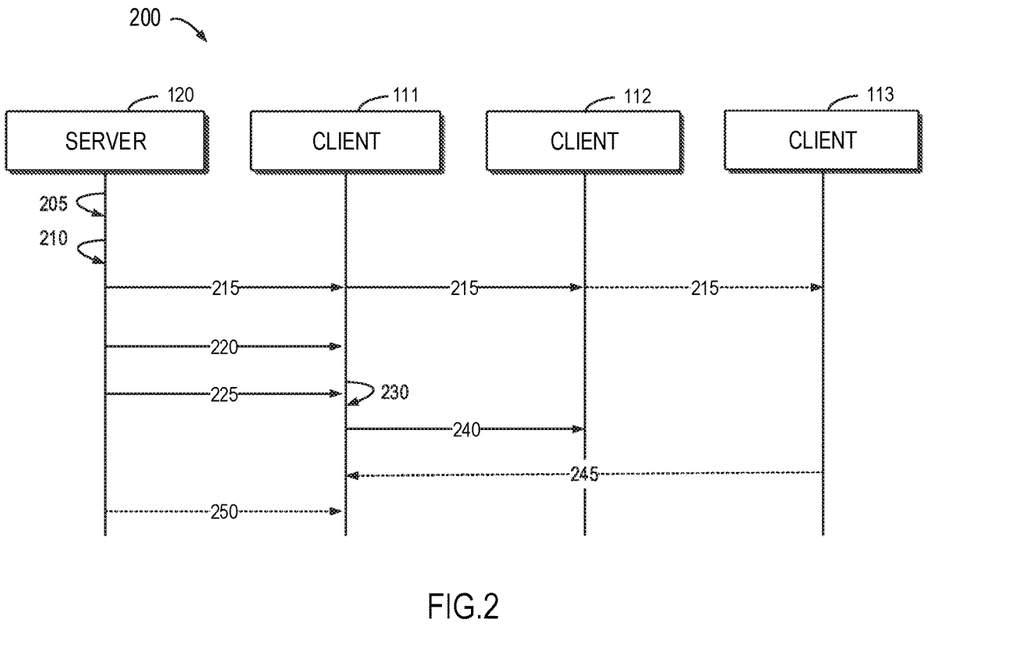
FIG. 2 illustrates a flowchart of an information processing procedure according to one or more embodiments of the present disclosure.

The embodiments of the present disclosure will be described below in detail with reference to the drawings. FIG. 2 illustrates a flowchart of an information processing procedure 200 according to an embodiment of the present disclosure. The procedure 200 can be implemented in the network 100 in FIG. 1. The procedure 200 involves the server 120, clients 111 and 112, and probably client 113. For discussion, the procedure 200 will be described below with reference to FIG. 1.

When the server 120 is required to obtain data from the clients 111, 112 . . . 113 of the subnet 110, the server 120 generates messages for the clients 111, 112 . . . 113 and arranges the generated messages into the message pool 130. In order to determine the attributes of the messages, the server 120 sets 205 metadata of the messages. Typically, the metadata can include at least target clients and priorities of the messages. When accessing the messages in the message pool 130, the clients can obtain metadata of the messages for convenience of pull.

In some embodiments of the present disclosure, the priorities of the messages included in the metadata can be set based on urgency of the messages. For example, a message required to be processed immediately can be set with a great numerical value, while a non-urgent message can be set with a small numerical value. In some embodiments of the present disclosure, the priority of the message can be increased progressively as time elapses. For example, an internal thread can be provided to scan the messages within the message pool in a certain time interval, and if a message that has not been pulled is scanned, the priority of the message is increased; or, a timer can be provided to measure the waiting time of a message, and if the value of the timer exceeds a certain time length, the priority of the message is increased. Setting priorities is advantages for optimizing the pull of the client and arranging pulls more reasonably. In an example, metadata of a message can include a numerical value indicating a level, for example, P3, for indicating the priority of the message.

The server 120 can determine 210 a cycle for a client in clients 111, 112 . . . 113 accessing messages in the message pool, based at least in part on the number of clients 111, 112 . . . 113 associated with the server 120. According to the embodiment of the present disclosure, the server 120 can adjust dynamically the cycles for these clients accessing the message pool 130, based on the current number of clients associated therewith.

Typically, there are certain access intervals between clients 111, 112 . . . 113 in the subnet 110, and these access intervals may or may not be even. In some embodiments of the present disclosure, when determining a cycle for clients accessing the message pool, a length of time window required for the clients 111, 112 . . . 113 in the subnet 110 accessing the message pool 130 can be determined based on the number of clients and access intervals, and how the cycle is set is determined based on whether the length of the time window exceeds a predetermined threshold. For example, if the required length of the time window is less than the predetermined threshold, the cycle for the clients accessing the message pool can be determined to be positively correlated with the number of the clients. That is, when the number of clients in the subnet 110 is increased, the length of the cycle can be elongated correspondingly, and when the number of clients is reduced, the length of the cycle can be shortened correspondingly. In some other cases, if the required length of the time window exceeds the predetermined threshold, the cycle for clients accessing the message pool can be set to a fixed value. For example, when the number of clients in the subnet 110 is too large, the cycle for clients accessing the message pool is not increased any longer but kept unchanged, as the number of clients grows.

In some embodiments of the present disclosure, the cycle for the clients accessing the message pool can also be determined by calculating a sleep period after the clients access the message pool, and the sleep period corresponds to the cycle of accessing the message pool. The clients are sleeping within the sleep period, and then access the message pool after the sleep period expires.

The above content will be described below for illustration. Only for clarification, it is assumed that the access intervals among the clients are set as even intervals. In the example, the cycle for the client (for example, the client 111, 112 or 113) in the subnet 110 accessing the message pool can be determined through Equations (1) to (3). First, the access interval among clients can be determined based on the Equation (1) which is provided below:

$$MinimalInterval = \min\left(MINIMAL\_INTERVAL, \frac{MAX\_CYCLE\_TIME}{Num_{clients}}\right) \quad (1)$$

Wherein, MinimalInterval is an access interval among all the clients in the subnet 110 to be determined, MINIMAL_INTERVAL is a predefined initial access interval, MAX_CYCLE_TIME is a maximum time window allowed by the system (which represents a time length required for all of the clients sequentially completing an access), and $Num_{clients}$ is the number of clients.

The procedure of determining the access interval among the clients will be described below with an example. It is assumed that MINIMAL INTERVAL=2 s and MAX_CYCLE_TIME=10 s. When the number of clients $Num_{clients}$ is 3, it can be determined that MINIMAL_INTERVAL is less than $$\frac{MAX\_CYCLE\_TIME}{Num_{clients}}.$$

According to the Equation (1), the access interval MinimalInterval among three clients is valued to the minimum value between MINIMAL_INTERVAL and $$\frac{MAX\_CYCLE\_TIME}{Num_{clients}},$$

and thus MinimalInterval=MINIMAL_INTERVAL, i.e., the minimum time interval MinimalInterval is 2 seconds. Meanwhile, the actual time length (i.e., the actual time window) required for the three clients to sequentially complete an access and message pull is 6 seconds.

Then, if a new client is added, the number of clients $Num_{clients}$ is 4. It can be determined that MINIMAL_INTERVAL is still less than $$\frac{MAX\_CYCLE\_TIME}{Num_{clients}}.$$

Therefore, according to Equation (1), MinimalInterval=MINIMAL_INTERVAL, i.e., the access interval MinimalInterval is still 2 seconds. In addition, the length of the actual time window is increased to 8 seconds.

Next, if two new clients are further added, the number of clients $Num_{clients}$ is 6. At this time, it can be determined that MINIMAL_INTERVAL is greater than $$\frac{MAX\_CYCLE\_TIME}{Num_{clients}}$$

Hence, according to Equation to (1), $$MinimalInterval = \frac{MAX\_CYCLE\_TIME}{Num_{clients}}, \text{ i.e.,}$$

the access interval $$MinimalInterval = \frac{13}{6} \approx 1.67 \text{ s}.$$

Furthermore, the actual time window is equal to the maximum time window allowed by the system (i.e., 10 seconds).

After determining the even access interval among the clients, the time window for a plurality of clients accessing the message pool in a cycle can be calculated as a product of the number of clients and the access interval. The plurality of clients may continuously access the message pool multiple times. The start timestamp of the $n^{th}$ cycle (i.e., the $n^{th}$ time window) for all clients accessing the message pool can be determined as follows:

$$Cycle_n = \begin{cases} INIT\_TIME\_STAMP \text{ (if } n = 1) \\ Cycle_{n-1} + Num_{clients} \times MinimalInterval) \end{cases} \quad (2)$$

wherein, $Cycle_n$ is the start timestamp of the $n^{th}$ cycle (i.e., the $n^{th}$ time window), INIT_TIME_STAMP is the start timestamp of the $1^{st}$ cycle, MinimalInterval is the access interval determined in Equation (1), and $Num_{client}$ is the number of clients.

On this basis, a next sleep period of a particular client (the interval between two accesses of the client, namely the access cycle) can be determined as follows:

$$Interval_{(n,x)} = (Cycle_{n+1} + x \times MinimalInterval_{n+1}) - CheckInTime_{(n,x)} \quad (3)$$

wherein, $Interval_{(n,x)}$ is the next sleep period obtained when the $x^{th}$ client is in the $n^{th}$ time window, $MinimalInterval_{n+1}$ is the access interval in the $(n+1)^{th}$ time window, and $CheckInTime_{(n,x)}$ is the timestamp for the $x^{th}$ client accessing and pulling an message in the $n^{th}$ time window.

Through Equations (1) to (3), the sleep period of clients in the subnet 110 can be determined based on the number of clients in the subnet 110, thereby implementing dynamic adjustment of the cycle for the clients accessing the message pool. In this way, when the number of clients is small, the initial access interval predefined by the system acts as the access interval of all of the clients, and the time length of each cycle therefore can be adjusted as the number of clients is changed, thereby relieving the pressure of the server. When the number of clients is great, the actual time window is fixed to the maximum time window permitted by the system, thereby avoiding serious delay resulting from a large time window.

It is noted that Equations (1) to (3) are only examples for implementing embodiments of the present disclosure, and the cycle for the clients accessing the server can be optimized in other manners. For example, the access intervals among a plurality of clients may not be even, or the access interval may be variable as the number of clients grows, in the case that the actual time window does not reach the maximum time window.

Returning to FIG. 2, the server 120 sends 215 a configuration of the determined cycle to the clients in the subnet 110 (for example, the client 111, 112 and probably the client 113), such that these clients access the message pool 130 according to the cycle, to pull messages belonging to them therefrom. The message pulling procedure at the client side will be described below from the perspective of the client 111.

The client 111 obtains 220, from the server 120, metadata of the messages in the message pool 130. As mentioned above, the metadata includes information, such as target clients, priorities and the like. By obtaining metadata, the client 111 can discern which messages in the messages 131, 132 . . . 135 in the message pool are associated with itself.

If the client 111 determines that the metadata indicates a certain message is associated with the client 111, the client 111 pulls 225 the message. For example, in the example of FIG. 1, the client 111 can obtain the metadata of the message 131, and if the metadata of the message 131 indicate the message 131 is associated with the client 111, the client 111 pulls 225 the message 131. Subsequent to pulling the message 131, the client 111 executes the corresponding processing for the message 131.

In some embodiments of the present disclosure, if the client 111 accesses the message pool 130, and finds a plurality of messages associated with itself, the client 111 can compare priorities of these messages, and pull preferentially the message with a high priority. However, the client 111 can also execute pull in other manners. For example, upon finding a message associated with itself, the client can execute pull immediately, not considering the priority.

For example, if the client 111 obtains the metadata of the message 132 and determines that the metadata indicates the message 132 is associated with the further client 112, the client 111 determines the priority of the message 132. In the case that the client 111 determines that the priority of the message 132 exceeds a predetermined threshold, the client 111 sends a paging message to a further client 112. Subsequently, upon receiving the paging message, the client 112 can pull immediately the message 132 from the message pool.

Typically, if the priority of the message 132 exceeds the predetermined threshold, this means that the message 132 is an urgent message required to be processed immediately. After finding that the urgent message is associated with the further client 112, the client 111 can notify the client 112 of the need of immediately pulling and processing the urgent message by sending a paging message to the client 112.

In some embodiments of the present disclosure, the client 111 can pull messages from the message pool 130 of the server 120, in response to a paging message from other client. For example, if the client 113 finds that a certain message associated with the client 111 is an urgent message having a priority exceeding the predetermined threshold while accessing the server 120 and obtaining the metadata of the messages, the client 113 will sends 245 a paging message to the client 111. After receiving the paging message from the client 113, the client 111 directly pulls 250 the urgent message from the message pool 130 of the server 120.

Figure 3:
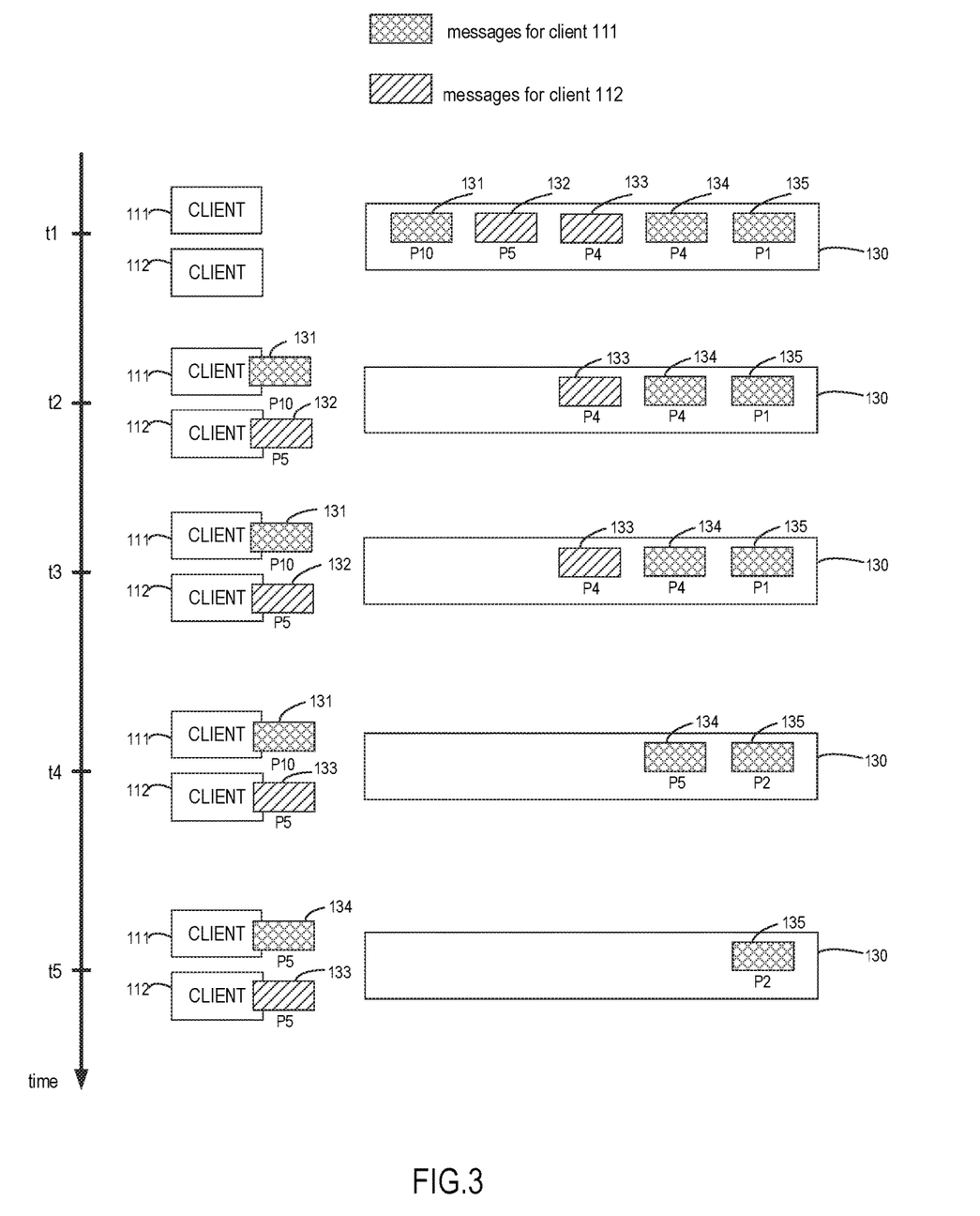
FIG. 3 illustrates a diagram of an example of pulling messages by clients from a message pool according to one or more embodiments of the present disclosure.

In order to describe the above embodiment of the present disclosure more clearly, FIG. 3 illustrates an example of pulling messages by the clients 111 and 112 from the message pool 130. In FIG. 3, for illustrating the present disclosure, it is assumed that the message pool 130 includes therein messages for the two clients 111 and 112, respectively. Moreover, it is further assumed that the client 111 or 112 can process at most one message simultaneously, and the messages each having a priority equal to or greater than the predetermined threshold P5 are urgent messages.

As shown in FIG. 3, there are five time points t1-t5 on the time axis. At the initial stage t1, the server 120 generates messages 131, 132, 133, 134 and 135 required to be pulled by the client 111 and the client 112, and places the five messages into the message pool 130. For example, the metadata information of the five messages includes the following: the target client of the message 131 is the client 111, and the priority thereof is P10; the target client of the message 132 is the client 112, and the priority thereof is P5; the target client of the message 133 is the client 112, and the priority thereof is P4; the target client of the message 134 is the client 111, and the priority thereof is P4; and the target client of the message 135 is the client 111, and the priority thereof is P1.

At t2, the client 111 accesses the message pool 130 for pull. The client 111 finds that the message 131 is associated with itself, and thus pulls and processes the message 131. Meanwhile, the client 111 finds that the target client of the message 132 is the client 112, and the priority of the message 132 is P5. The priority of the message 132 is equal to the predetermined threshold P5, and the message 132 therefore is an urgent message. Because the client 111 finds an urgent message associated with the further client 112, the client 111 sends a paging message to the client 112. Then, the client 112 pulls immediately the message 132 from the message pool 130 and processes the same.

At t3, the client 112 accesses the message pool 130. The client 112 does not find any urgent messages. As described above, it is assumed that each client can process at most one message simultaneously. Because the client 112 is still processing the message 132 and unable to process other messages, the client 112 does not pull new messages.

At t4, the client 111 accesses the message pool 130. At this time, there are still three messages, i.e. messages 133, 134 and 135, in the server that have not been pulled and processed. Because the three messages are still not pulled after the first cycle, it is assumed that the respective priorities of the messages 133, 134 and 135 would be increased progressively. As shown in FIG. 3, the priority of the message 133 is increased to P5, the priority of the message 134 is increased to P5, and the priority of the message 135 is increased to P2. Moreover, between t3 and t4, the client 112 has completed processing for the message 132. However, the client 111 is still processing the message 131, and thus will not pull any new message at t4. At the same time, the client 111 accesses the messages 133, 134 and 135 in the message pool 130. When the client 111 finds that the message 133 is an urgent message and associated with the client 112, the client 111 sends a page to the client 112. The client 112 having completed processing of the message 132 pulls and processes the message 133, in response to the page of the client 111.

At t5, the client 112 accesses the message pool 130 for pull. At this time, the client 111 completes the processing for the message 131. Because the client 112 is processing the message 133, the client 112 does not pull new messages. However, when accessing the message pool 130, the client 112 finds that the message 134 associated with the client 111 is an urgent message. The client 112 pages the client 111, and the client 111 thus pulls the message 134 from the message pool and processes the same.

As shown in FIG. 3, as compared with the conventional solution, the solution according to the embodiment of the present disclosure saves time of one access interval for the client 112 in the first cycle, and time of at least one access interval for the client 111 and the client 112 in the second cycle. The solution of the present disclosure can reduce efficiently the delay in pulling and processing messages, by providing the paging function.

Table 1 shows comparative data of the conventional solution and one example implementation of the solution of the present disclosure. The conventional solution provided for comparison is the solution as mentioned above, in which the clients access the message pool in a fixed interval. In Table 1, the delay represents a difference obtained by subtracting a timestamp of placing a message into the message pool 130 from the timestamp of pulling the message (including both periodically accessing and pulling the message, and directly pulling the message due to being paged) by the target client, the fixed interval is a cycle for each client accessing the server in the conventional solution, MI is MINIMAL_INTERVAL Equation (1), and MCT is MAX_CYCLE_TIME in Equation (1).

TABLE 1

| Number of clients | Configuration in the conventional solution | Delay in the conventional solution | Server pressure in the conventional solution | Configuration in the solution of the present disclosure | Delay in the solution of the present disclosure | Server pressure in the solution of the present disclosure |
|---|---|---|---|---|---|---|
| 5 | Fixed interval: 30 s | <30 s | 10 req/min | MI:1 s MCT: 1200 s | ~1 s | ~60 req/min |
| 60 | Fixed interval: 30 s | <30 s | 120 req/min | MI:1 s MCT: 1200 s | ~1 s | ~60 req/min |
| 1200 | Fixed interval: 10 m | <10 m | 120 req/min | MI:1 s MCT: 1200 s | ~1 s | ~60 req/min |

As shown in Table 1, as the number of clients grows, the conventional solution brings about the greater delay. For example, when the numbers of clients are 5 and 60, the delay in the conventional solution is less than 30 seconds, and when the number of clients is 1200, the delay in the conventional solution reaches less than 10 minutes. In contrast, according to the solution of the embodiment of the present disclosure, the delay is low, which, for example, can be reduced to the minimum of about 1 second. In addition, the delay according to the embodiment of the present disclosure is not increased significantly as the number of clients grows.

Moreover, the pressure of the server in the conventional solution is increased as the number of clients grows. For example, as seen from Table 1, when the number of clients is 5, the server pressure in the conventional solution is 10 requests per minute; and when the numbers of clients are 60 and 1200, the server pressure in the conventional solution reaches 120 requests per minute. In comparison, the server pressure according to the solution of the embodiment of the present disclosure is always kept at about 60 requests per minute. As seen above, the present solution can keep the server pressure at a stable level, instead of increasing the server pressure as the number of clients grows.

In general, as compared with the conventional solution in which a fixed interval is provided, the solution according to the embodiment of the present disclosure brings about a lower delay and a more stable server pressure. This can improve the user experience, and reduce a possibility of server breakdown due to incorrect configuration (for example, using conventional configuration to cope with the significantly increased business amount).

Figure 4:
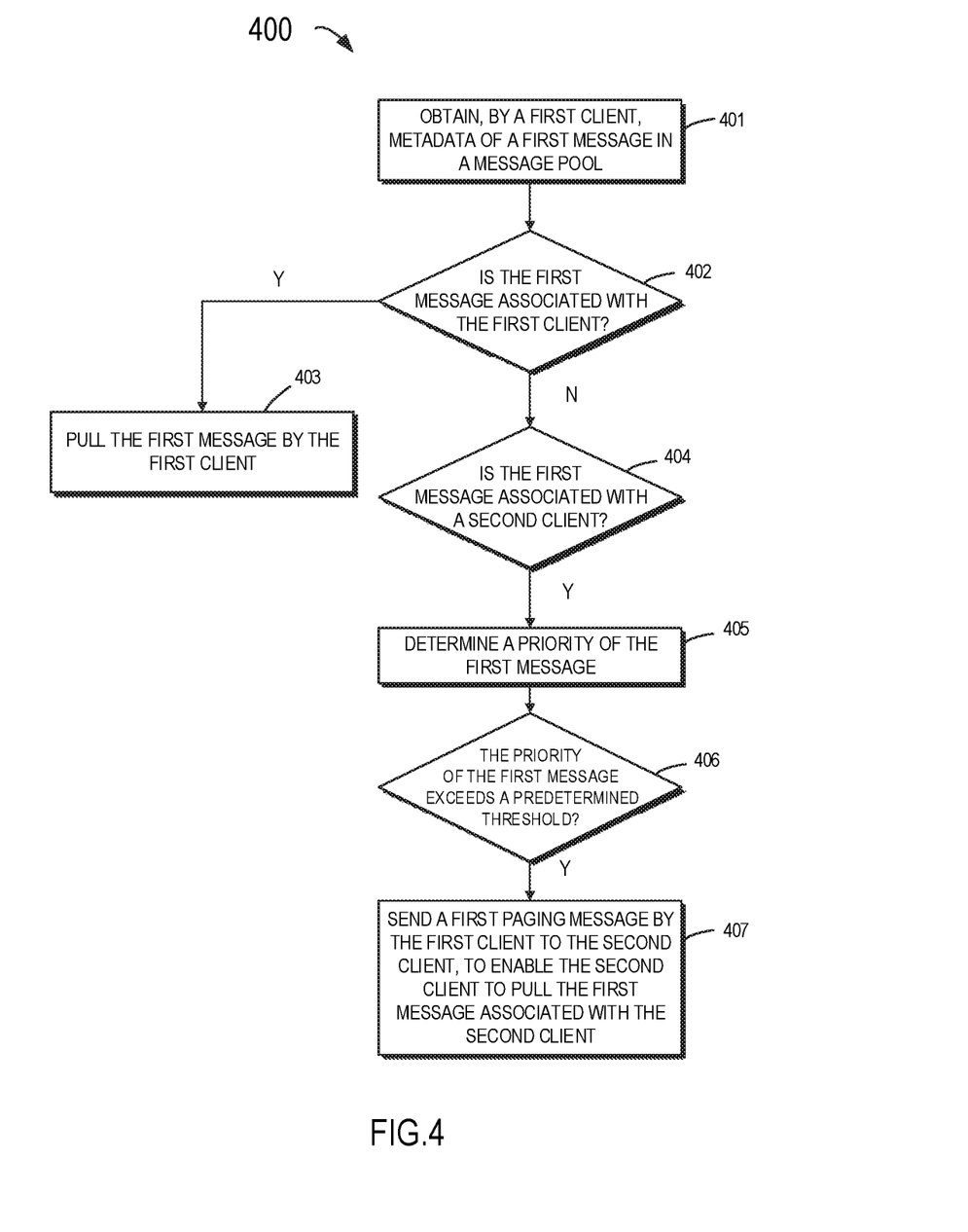
FIG. 4 illustrates a procedure block diagram of a method of information processing at a client side according to one or more embodiments of the present disclosure.
Figure 5:
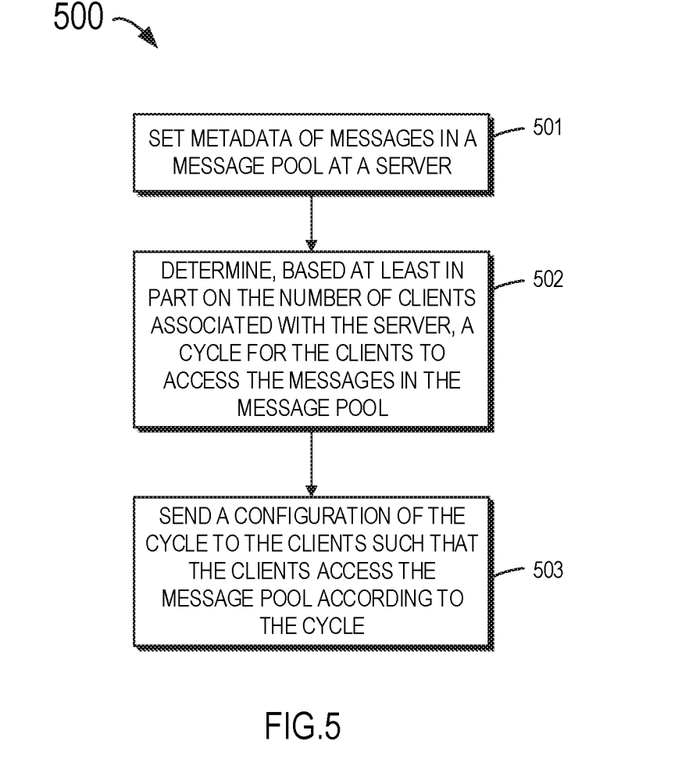
FIG. 5 illustrates a procedure block diagram of a method of information processing at a server side according to one or more embodiments of the present disclosure.

With reference to FIGS. 4 and 5, FIG. 4 illustrates a procedure block diagram of a method 400 of information processing at a client side. The method 400 is described from the perspective of the first client. The first client can be any one of clients 111, 112 . . . 113. The second client and the third client in the method 400 can be any the same or different clients in the clients 111, 112 . . . 113, other than the first client.

At block 401, metadata of a first message in the message pool are obtained by the first client. At block 402, it is determined whether the first message is associated with the first client. At block 403, in response to the first message being associated with the first client, the first message is pulled by the first client. At block 404, if the first message is not associated with the first client, it is determined whether the first message is associated with the second client. At block 405, in response to the first message being associated with the second client, a priority of the first message is determined. At block 406, it is determined whether the priority of the first message exceeds a predetermined threshold. At block 406, in response to the priority of the first message exceeding the predetermined threshold, the first client sends a first paging message to the second client, so that the second client pulls the first message associated with the second client.

In some embodiments of the present disclosure, pulling the first message by the first client further includes: comparing the priority of the first message with a priority of the third message, the third message associated with the first client; and in response to the priority of the first message exceeding the priority of the third message, pulling the first message by the first client.

In some embodiments of the present disclosure, the first client receives a second paging message from the third client, the second paging message indicates that the message pool includes a second message associated with the first client, and the priority of the second message exceeds the predetermined threshold; and in response to the second paging message, the second message is pulled by the first client.

In some embodiments of the present disclosure, the first client receives a configuration on a cycle from the server, and the first client is configured to obtain metadata of messages in the message pool according to the cycle.

In some embodiments of the present disclosure, the configuration about the cycle is a sleep period since a client obtains the metadata, within which the client ceases obtaining of metadata of messages in the message pool.

FIG. 5 illustrates a procedure block diagram of a method 500 of information processing at a server side according to an embodiment of the present disclosure. The method 500 can be implemented at the server 120.

As shown in FIG. 5, at block 501, metadata of messages in the message pool are set at the server. At block 502, a cycle for clients accessing messages in the message pool is determined based at least in part on the number of clients associated with the server. At block 503, the configuration of the cycle is sent to the clients, so that the clients access the message pool according to the cycle.

In some embodiments of the present disclosure, setting metadata may include setting priorities of messages. More specifically, the priorities of messages may be set based on urgency of the messages. In addition, setting the priorities of the messages may include scan the messages in the message pool by the server in a fixed time interval, and in response to scanning messages in the message pool, increasing progressively the priorities of the messages scanned. In some embodiments of the present disclosure, determining the cycle for the clients accessing the messages in the message pool may include: determining a length of a time window required for these clients accessing the message pool, based on the number of clients associated with the server and a length of an access interval among these clients; and in response to the length of the determined time window being less than a threshold, setting a length of the cycle to be positively correlated with the number of clients.

In some embodiments, determining the cycle for the clients accessing the messages in the message pool may include: determining the length of the time window required for these clients for accessing the message pool, based on the number of clients associated with the server and the length of the access interval among these clients; and in response to the determined length of the time window exceeding a threshold, setting the length of the cycle to a fixed value.

In some embodiments, determining the cycle for the clients may include: calculating a sleep period since the clients access the messages in the message pool, the sleep period corresponding to the cycle.

In some embodiments, the calculated sleep period is sent to the clients, so as to prevent the clients from accessing the message pool within the sleep period.

Figure 6:
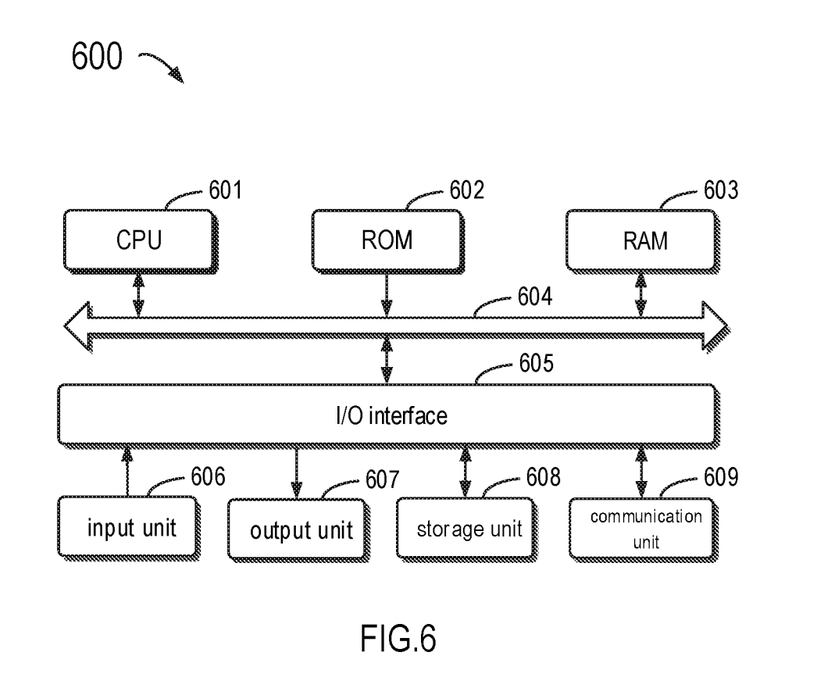
FIG. 6 illustrates a block diagram of an example device that can be used to implement one or more embodiments of the present disclosure.

FIG. 6 illustrates an example block diagram of an example device 600 that can be used to implement an embodiment of the present disclosure. The device 600 can be implemented as the server 120 in FIG. 1 or any one of clients in the subnet 110. The device 600 can be used to implement the method 400 or 500 in FIG. 4 or 5.

As shown, the device 600 includes a central processing unit (CPU) 601 which performs various appropriate acts and processing, based on a computer program instruction stored in a read-only memory (ROM) 602 or a computer program instruction loaded from a storage unit 608 to a random access memory (RAM) 603. The RAM 603 stores therein various programs and data required for operations of the device 600. The CPU 601, the ROM 602 and the RAM 603 are connected via a bus 604 with one another. An input/output (I/O) interface 605 is also connected to the bus 604.

The following components in the device 600 are connected to the I/O interface 605: an input unit 606 such as a keyboard, a mouse and the like; an output unit 607 such as various kinds of displays and a loudspeaker, etc.; a storage unit 608 such as a magnetic disk, an optical disk, and etc.; and a communication unit 609 such as a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the method 400 or 500, may be executed by the processing unit 601. For example, in some embodiments, the method 400 or 500 may be implemented as a computer software program or a computer program product that is tangibly included in a machine readable medium, e.g., a non-transient computer readable media such as the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the procedure 200 as describe above can be executed. Alternatively, in other embodiments, the CPU 601 can be configured in any other appropriate manner (for example, by means of firmware) to execute the method 400 or 500.

Those skilled in the art would appreciate that, each step of the above method according to the present disclosure can be implemented via a general computing device, and they can be integrated on a single computing device or distributed over a network formed by a plurality of computing device. Optionally, they can be implemented by program code executable by a computing device, such that they can be stored on a storage device to be executed by a computing device, or they are produced as various integrated circuit modules, respectively, or a plurality of modules or steps therein is implemented by a single integrated circuit module. As such, the present disclosure is not limited to any particular combination of hardware and software.

It will be noted that although various units or sub-units of the apparatus have been mentioned in the above detailed description, such partitioning is not for limitation. In practice, according to the embodiments of the present invention, the features and functions of two or more units described above may be embodied in one unit. In turn, the features and functions of one unit described above may be further embodied in more units.

Those described above are only optional embodiments of the present disclosure, without limiting the present disclosure, and for those skilled in the art, the present disclosure may allow various modifications and changes. Within the spirits and principles, any amendment, equivalent substitution, improvement and the like shall be all covered within the protection scope of the present disclosure.

We claim:

1. An information processing method, comprising:
    obtaining, by a first client, metadata of a first message in a message pool stored in storage separate from the first client, wherein the first message and the metadata are stored in the message pool by a server;
    in response to a first determination, by the first client, that the metadata indicates that the first message is associated with the first client, pulling the first message by the first client;
    in response to a second determination, by the first client, that the metadata indicates that the first message is associated with a second client, determining a priority of the first message, wherein the priority of the first message is included in the metadata; and
    in response to making a third determination, by the first client, that the priority of the first message exceeds a predetermined threshold, sending a first paging message by the first client to the second client to enable the second client to pull the first message associated with the second client,
    wherein the second client pulls the first message in response to receiving the paging message from the first client.

2. The method of claim 1, further comprising:
    receiving a second paging message by the first client from a third client, the second paging message indicating that the message pool comprises a second message associated with the first client, and that a priority of the second message exceeds the predetermined threshold; and
    in response to the second paging message, pulling the second message by the first client.

3. The method of claim 1, wherein the first client is configured to obtain metadata of messages in the message pool in accordance with a configurable cycle, wherein the metadata of the messages comprises the metadata of the first message.

4. The method of claim 3, wherein the configuration cycle specifies a sleep period of the first client after obtaining the metadata of the messages, wherein during the sleep period the first client does not access the message pool.

5. The method of claim 1, wherein pulling the first message by the first client further comprises:
    comparing the priority of the first message with a priority of a third message, the third message being associated with the first client; and
    in response to the priority of the first message exceeding the priority of the third message, pulling the first message by the first client.

6. The method of claim 3, wherein:
    the configuration cycle is based, at least in part, on a number of a plurality of clients accessing the message pool.

7. The method of claim 6, wherein the configuration cycle specifies an access interval based, at least in part, on the number of the plurality of clients accessing the message pool.

8. The method of claim 6, wherein the configuration cycle specifies an access interval for each of the plurality of clients to access the message pool, wherein each of the access intervals are identical for each of the plurality of clients.

9. An electronic device, comprising:
    a processor; and
    a memory coupled to the processor, the memory having instructions stored therein which, when executed by the processor, cause the electronic device to perform a method, the method comprising:
        obtaining, by a first client, metadata of a first message in a message pool stored in storage separate from the first client, wherein the first message and the metadata are stored in the message pool by a server;
        in response to a first determination, by the first client, that the metadata indicates that the first message is associated with the first client, pulling the first message by the first client;
        in response to a second determination, by the first client, that the metadata indicates that the first message is associated with a second client, determining a priority of the first message, wherein the priority of the first message is included in the metadata; and
        in response to making a third determination, by the first client, that the priority of the first message exceeds a predetermined threshold, sending a first paging message by the first client to the second client to enable the second client to pull the first message associated with the second client, wherein the second client pulls the first message in response to receiving the paging message from the first client.

10. The electronic device of claim 9, wherein the method further comprises:

receiving a second paging message from a third client by the first client, the second paging message indicating that the message pool comprises a second message associated with the first client, and that a priority of the second message exceeds the predetermined threshold; and in response to the second paging message, pulling the second message by the first client.

11. The electronic device of claim 9, wherein the first client is configured to obtain metadata of messages in the message pool in accordance with a configurable cycle, wherein the metadata of the messages comprises the metadata of the first message.

12. The electronic device of claim 11, wherein the configuration cycle specifies a sleep period of the first client after obtaining the metadata of the messages, wherein during the sleep period the first client does not access the message pool.

13. The electronic device of claim 9, wherein pulling the first message by the first client further comprises:

comparing the priority of the first message with a priority of a third message, the third message being associated with the first client; and in response to the priority of the first message exceeding the priority of the third message, pulling the first message by the first client.

14. The electronic device of claim 11, wherein the configuration cycle is based, at least in part, on a number of a plurality of clients accessing the message pool.

15. The electronic device of claim 14, the configuration cycle specifies an access interval based, at least in part, on the number of the plurality of clients accessing the message pool.

16. The electronic device of claim 11, wherein the configuration cycle specifies an access interval for each of the plurality of clients to access the message pool, wherein each of the access intervals are identical for each of the plurality of clients.

17. A computer program product being tangibly stored on a computer readable medium and comprising computer executable instructions which, when executed, cause a device to perform a method, the method comprising:

obtaining, by a first client, metadata of a first message in a message pool stored in storage separate from the first client, wherein the first message and the metadata are stored in the message pool by a server;

in response to a first determination, by the first client, that the metadata indicates that the first message is associated with the first client, pulling the first message by the first client;

in response to a second determination, by the first client, that the metadata indicates that the first message is associated with a second client, determining a priority of the first message, wherein the priority of the first message is included in the metadata; and in response to making a third determination, by the first client, that the priority of the first message exceeds a predetermined threshold, sending a first paging message by the first client to the second client to enable the second client to pull the first message associated with the second client, wherein the second client pulls the first message in response to receiving the paging message from the first client.

18. The computer program product of claim 17, wherein the method further comprises:

receiving a second paging message by the first client from a third client, the second paging message indicating that the message pool comprises a second message associated with the first client, and that a priority of the second message exceeds the predetermined threshold; and in response to the second paging message, pulling the second message by the first client.

19. The computer program product of claim 17, wherein the first client is configured to obtain metadata of messages in the message pool in accordance with a configurable cycle, wherein the metadata of the messages comprises the metadata of the first message.

20. The computer program product of claim 17, wherein pulling the first message by the first client further comprises:

comparing the priority of the first message with a priority of a third message, the third message being associated with the first client; and in response to the priority of the first message exceeding the priority of the third message, pulling the first message by the first client.

* * * * *